United States Patent
Priebe et al.

(10) Patent No.: US 10,999,582 B1
(45) Date of Patent: May 4, 2021

(54) SEMANTICALLY SEGMENTED VIDEO IMAGE COMPRESSION

(71) Applicant: Awecom, Inc., San Francisco, CA (US)

(72) Inventors: Christopher Priebe, Houston, TX (US); Darren Rhea, Austin, TX (US); Christopher Hillar, San Francisco, CA (US); Alexander Terekhov, San Francisco, CA (US); Felix Effenberger, Stuttgart (DE)

(73) Assignee: AWECOM, INC., San Francisco, CA (US)

( * ) Notice: Subject to any disclaimer, the term of this patent is extended or adjusted under 35 U.S.C. 154(b) by 0 days.

(21) Appl. No.: 16/601,419

(22) Filed: Oct. 14, 2019

(51) Int. Cl.
| | |
|---|---|
| *H04N 19/167* | (2014.01) |
| *H04N 19/176* | (2014.01) |
| *G06K 9/62* | (2006.01) |
| *G06K 9/00* | (2006.01) |
| *G06N 3/08* | (2006.01) |
| *H04N 19/154* | (2014.01) |

(52) U.S. Cl.
CPC ....... *H04N 19/167* (2014.11); *G06K 9/00724* (2013.01); *G06K 9/00765* (2013.01); *G06N 3/08* (2013.01); *H04N 19/154* (2014.11); *H04N 19/176* (2014.11); *G06K 2009/00738* (2013.01)

(58) Field of Classification Search
CPC .. H04N 19/167; H04N 19/154; H04N 19/176; G06N 3/08; G06K 9/00765; G06K 9/00724; G06K 2009/00738
See application file for complete search history.

(56) References Cited

U.S. PATENT DOCUMENTS

| | | | |
|---|---|---|---|
| 2010/0124274 A1* | 5/2010 | Cheok | H04N 19/152 375/240.03 |
| 2018/0176578 A1* | 6/2018 | Rippel | G06N 3/04 |
| 2019/0007690 A1* | 1/2019 | Varadarajan | H04N 19/17 |

* cited by examiner

*Primary Examiner* — Clifford Hilaire
*Assistant Examiner* — Tyler B Edwards
(74) *Attorney, Agent, or Firm* — Steven M. Greenberg, Esq.; Shutts & Bowen LLP

(57) ABSTRACT

Semantically-segmented video compression includes loading a frame of video imagery, determining a context for the frame, selecting an object of interest for the context and identifying within the frame, a portion of the frame of the imagery deemed to be of greater interest than other portions of the frame of video imagery based upon the object of interest of the context determined for the video imagery, and an object, that has been pre-specified to be of importance to the context. A hybrid compression of the video imagery is then performed that includes both a higher quality compression of the portion of the video imagery determined to be a region of higher interest that produces a minimization of loss during decompression and also a compression of the other portions of the video imagery determined not to be a region of higher interest that produces more loss during decompression.

18 Claims, 2 Drawing Sheets

SEMANTICALLY SEGMENTED VIDEO IMAGE COMPRESSION

BACKGROUND OF THE INVENTION

Field of the Invention

The present invention relates to the field of image compression and more particularly to video compression.

Description of the Related Art

Image compression refers to the application of data compression to digital imagery. Image compression algorithms account for visual perception and the statistical properties of image data to provide superior compression as compared to generalized data compression used in the compression of non-imagery. Video compression is related to image compression in so far as video imagery is a sequence of static images that when presented in time order produce full motion video.

Generally speaking, image compression techniques as applied to static imagery are one of many approaches, typically used in combination, to compress video. Popular video compression standards include H.261, H.263, MPEG-1, MPEG-2, MPEG-4, H.264, H.265, VP8, and AV1. Common to each of the foregoing standards is a combination of techniques for reducing information redundancies in both spatial and temporal directions. Spatial compression reduces the size of frames in video data by utilizing image compression techniques which include chroma subsampling, discrete cosine transforms, and entropy coding, among others. Temporal compression, such as inter frame compression, or motion compensation, significantly reduces the amount of data needed to store a video frame by encoding only the pixels that change between consecutive frames in a sequence, among other techniques that rely on small differences between images in a sequence.

Of note, different video compression techniques address three primary objectives of high compression efficiency, high quality, and low complexity. Each technique, however, while excelling in one of the three primary objectives may fall short in another of the three primary objectives. Thus, at the outset, a decision is to be made in video compression as to which of the three primary objectives are to be prioritized at the expense of the other primary objectives. In doing so, a principal assumption is that the video imagery is to be treated uniformly and that each portion of the video imagery is of equal importance in respect to the entirety of the video imagery--especially in so far as the contextual cues of an image recognizable by human vision are not readily understood by automated means.

BRIEF SUMMARY OF THE INVENTION

Embodiments of the present invention address deficiencies of the art with respect to video compression and provide a novel and non-obvious method, system, and computer program for semantically-segmented video compression. In an embodiment of the invention, a semantically-segmented video compression method includes loading into memory of a computer, a frame of video imagery, determining a context for the frame and selecting an object of interest for the context. Thereafter, a portion of the frame may be identified that is deemed to be of greater interest than other portions of the frame of imagery based upon the object of interest of the context determined for the video imagery. In this regard, the context may be a sporting event or a video conference, to name two examples. The portion further is deemed to be of greater interest in respect to an object in the portion, such as a player with a ball in the case of a context that is a sporting event, that has been pre-specified to be of importance to the context. The method additionally includes performing compression of the video imagery that includes both a higher quality compression of the portion of the video imagery determined to be of greater interest that produces a minimization of loss during decompression and also a lower quality compression outside of the portion determined to be of greater interest that produces more loss during decompression, where loss refers to quality loss or bit loss or both, simultaneously.

In one aspect of the embodiment, compression is performed after submitting each block, or collection of pixels, of the video imagery to a neural network trained to indicate whether or not the block is of greater interest in respect to the determined context. In another aspect of the embodiment, multiple different portions of the frame are deemed to be of different degrees of interest based upon the determined context and different corresponding objects in the frame are identified and classified at different levels of importance so that the different modes of compression at different levels of aggressiveness are associated with the different levels of importance. In yet another aspect of the embodiment, the method further includes image processing the frame to identify a context of the frame.

In another embodiment of the invention, a video image compression system includes a host computer with memory and at least one processor and a video compressor executing in the memory of the host computer. The system further includes a semantic segmentation module that includes computer program instructions loaded in the memory of the host computer. The instructions are enabled to perform loading into the memory a frame of video imagery, determining a context for the frame and selecting an object of interest for the context, identifying within the frame, a portion of the frame of the video imagery deemed to be of greater interest than other portions of the frame of video imagery based upon the object of interest of the context determined for the video imagery, and an object pre-specified to be of importance to the context, and performing a compression of the video imagery that includes both compression of the portion of the video imagery determined to be of greater interest that produces a minimization of loss while preserving quality during decompression and also compression of the other portions of the video imagery outside of the portion determined to be of greater interest that produces more loss, sacrificing some quality, during decompression.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
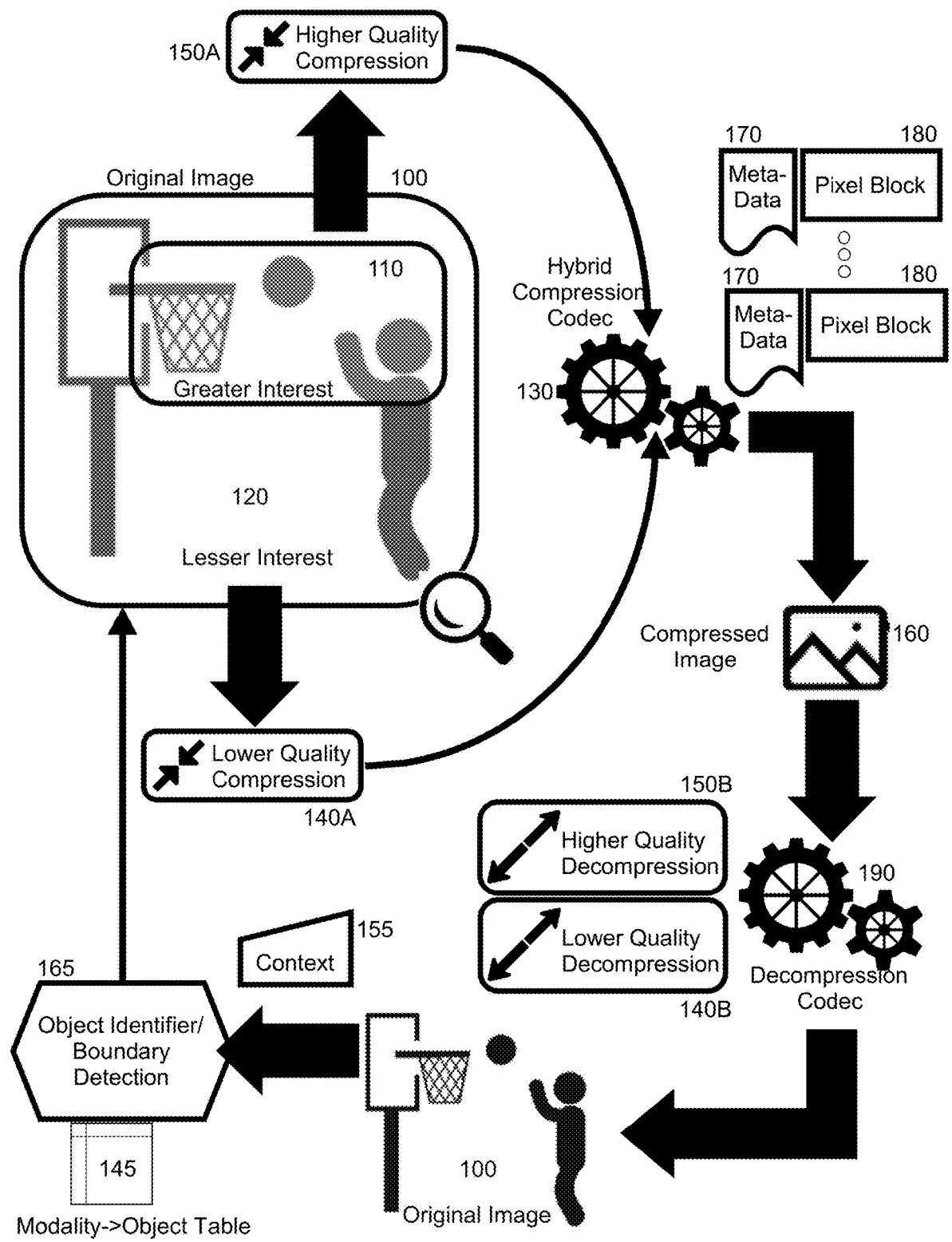
FIG. 1 is a pictorial illustration of a process for semantically-segmented video compression.

Embodiments of the invention provide for semantically-segmented video compression. In accordance with an embodiment of the inventive arrangements, video imagery may be loaded into memory, either in subsequent to the capturing of the entirety of the video imagery, or in real time as the video clip imagery is captured. A context of the video imagery is determined, such as a particular view of a particular sporting event, a dramatic performance, a speech, or a location interior to or exterior to a building. In this regard, the context can be a particular modality of the view such as a landscape view of a competition, or a close-up view of a select few players of the competition, a view of spectators of the competition, or a view of a ball or puck of the competition.

Based upon the context, an object or multiple objects of interest such as a player with a ball or puck, a face of a person, a complete individual, or an item placed positioned at the interior or exterior location, is selected in association with the context. For instance, the object or objects of interest may be selected by way of a table correlating different objects of interest with a particular context. For instance, in the context of a panoramic view of spectators at a performance, an object of interest may be a standing spectator as opposed to seated spectators, or a sign held by a spectator. As another example, in the context of a close-up view of a player in a spectator sport, the objects of interest may be the face of the player and the ball or puck used during the sport. As even yet another example, in the context of a lobby of a bank, an object of interest may be the face of a standing person in the lobby.

Thereafter, the object or objects are located within a first frame of the video imagery. In this regard, the first frame may be submitted to a neural network selected in accordance with keywords associated with the object or objects and trained to locate different pixels or blocks of pixels in a received image in which a confidence exists that the pixels or blocks of pixels are included in an image of the object or objects. For each pixel or block of pixels determined by the neural network to be part of an image of the object or objects, the pixel or block of pixels may be identified as being part of a portion determined to be of greater interest whereas remaining pixels or blocks of pixels are identified as being part of a portion determined to be of lesser interest.

Consequently, a more lossy compression of the video imagery is performed upon the portion of the frame that is outside of the portion determined to be of greater interest, while a less lossy compression of the video imagery is performed upon the portion of the frame determined to be of greater interest. The process then repeats for a next frame of the video imagery beginning with the location of the object within the next frame. Optionally, provided that the video is captured with a sufficiently high frame rate, every other frame of the video may be compressed in its entirety using only the more lossy compression as quality degradation is less easily perceived when displayed for an extremely short interval. The utilization of higher quality less lossy compression can be limited to only that portion of the video imagery deemed most relevant while lower quality, but more lossy compression can be performed elsewhere in the video imagery.

In further illustration, FIG. 1 is a pictorial illustration of a process for semantically-segmented video compression. As shown in FIG. 1, a frame 100 of video imagery can be processed for a context, such as a sporting event (shown herein), a dramatic or non-dramatic performance such as a musical performance, acting performance or speaking performance, video telephony, or a surveillance task such as the surveillance of an interior or exterior space, or of an object disposed within an interior or exterior space. The context can be processed manually by reading in connection with the video imagery, meta-data explicitly stating the context, or the context can be processed automatically through the use of an image recognition tool.

In this regard, an object identifier and boundary detector 165 processes the frame 100 to determine a general context 155 and then a particular view of the context 155 such as a close up view of players or actors in a performance, a panned out audience view of a performance or a panned out view of the performance itself. In association with the general context 155, the object identifier and boundary detector 165 refers to a modality-object table 145 to locate different objects of interest for the general context 155. For instance, the objects of interest include, by way of example, a ball or puck in the case of the context of a sporting event, the face or complete body of a person in the case of a dramatic or non-dramatic performance, a specific location within a surveilled space, or a specific article disposed within the surveilled space in the case of the context of surveillance.

Once the object has been determined, the frame 100 is processed to locate the object within the frame 100 and to define a region of greater interest 110 such that the portions of the frame 100 existing outside of the region of greater interest 110 are determined to be regions of lesser interest 120.

Thereafter, the portion of the frame 100 defined as the region of greater interest 110 is subjected to higher quality compression 150A, e.g. less lossy compression, whereas the portion of the frame 100 defined as the region of lesser interest 120 is submitted to lower quality compression 140A, e.g. more lossy compression. In one aspect of the embodiment, objects of interest within a threshold distance of the determined object have their regions subjected to a differing level of compression as compared to regions of objects more distant from the determined object. Optionally, the level of compression applied to object of interest regions can be a function of distance from the determined object such that quality is lower for more distant objects from the determined object and higher for objects closer to the determined object.

This degrading quality function can also be applied to the unremarkable regions, otherwise known as the the leftover regions of the frame after the regions of interest have been determined, of the frame that are subject to loss, thereby providing for a more substantial loss and reduction of quality in the region most distant from the determined object while providing for a less lossy and less aggressive reduction in quality in the unremarkable regions closer to the determined object. By way of example, to the extent that the general context 155 is determined to be a sporting event and the object a ball, a physical distance of a player within the imagery to the ball is determined and to the extent that any player is found to be within a pre-defined threshold distance from the ball, only those players are determined to be within the region of greater interest 110 so as to ensure higher fidelity compression as the players are presumed to be most relevant given the proximity of those faces to the ball.

In any event, as it will be apparent, the combination of both compression schemes 140A, 150A form the basis of the compression process of encoder 130 resulting in a compressed frame 160 of the video imagery and can be repeated for each other frame of the video imagery. In this regard, as each pixel block 180 of the image 100 is received, it is determined if the block 180 falls within the region of greater interest 110 and if so, the encoder 130 applies the higher quality compression 150A. Conversely, if it is determined that the block 180 does not fall within the region of greater interest 110, but within the region of lesser interest 120, the encoder 130 applies the lower quality compression 140A.

Conversely, once the compressed frame 160 has been stored in persistent storage, the compressed frame 160 may be decompressed utilizing a standard decoder 190 in order to reconstruct the frame 100. In this way, as each frame of the video imagery is subjected to the compression process of encoder 130, only the portion of each frame is permitted the luxury of the higher quality, less lossy higher quality compression scheme 150A (even as the region of greater interest 110 changes given the changing position within the frame 100 of the determined object), whereas the region of lesser interest 120 of each frame is subjected to the more lossy compression scheme 140A. Consequently, the portion of the video imagery of greatest interest to the viewer always appears superior in quality to portions of lesser interest owing to the increased lossier compression.

Figure 2:
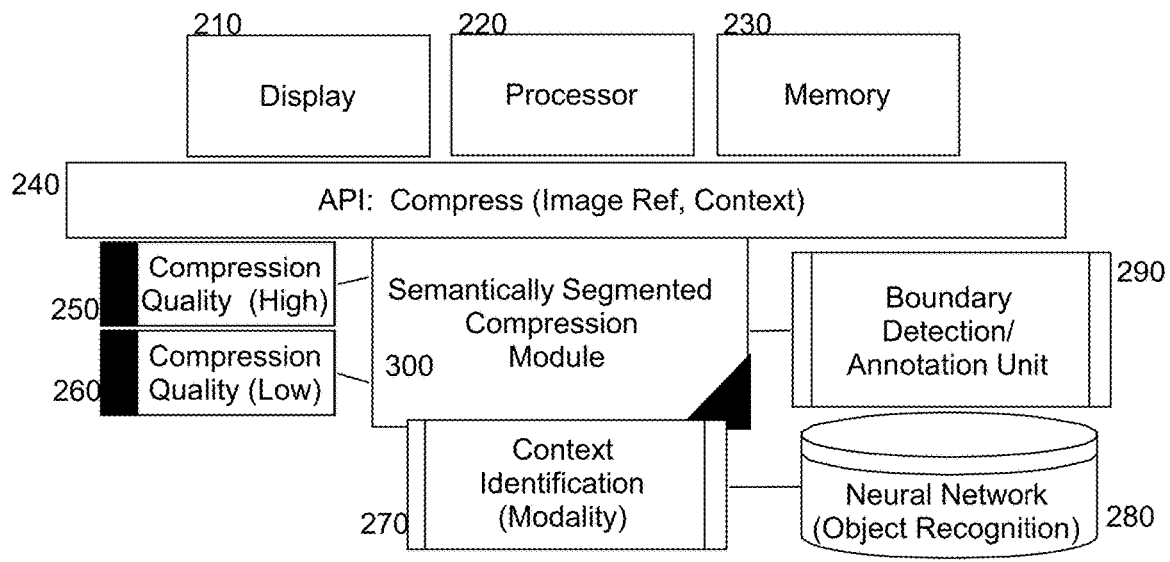
FIG. 2 is a schematic illustration of a computer data processing system adapted for semantically-segmented video compression; and, FIG. 3 is a flow chart illustrating a process for semantically-segmented video compression.

The process described in connection with FIG. 1 may be implemented in a computer data processing system. In further illustration, FIG. 2 schematically shows a computer data processing system adapted for semantically-segmented video compression. The system includes a host computing platform that includes one or more computers, each with a display 210, processor 220 and memory 230. A video compression module 300 executes in the memory 230 of the host computing system and may be accessed by way of a method defined within an application programming interface (API) 240. Optionally, the video compression module 300 includes a context identification component 270. Finally, the video compression module 300 is coupled to a deep neural network 280 trained to recognize a block of pixels within each of the different frames of video imagery determined to be within a region of greater interest.

The video compression module 300 includes computer program instructions that execute in the memory 230 by the processor 220 and are adapted to respond to the invocation of the method of the API 240 by performing compression of video imagery. Specifically, the program instructions are adapted to respond to either a local invocation of the method of the API 240 wherein the program instructions are co-positioned with an image acquisition apparatus acquiring the video imagery, or remote invocation of the method of the API 240 wherein the program instructions are remotely positioned over a computer communications network from the image acquisition apparatus acquiring the video imagery. More particularly, the invocation of the method of the API 240 can include a file location or network location reference to the video imagery and optionally, an explicit specification of a context for the video imagery. To the extent that the context is not explicitly specified in the invocation of the method of the API 240, the context may be determined by way of the context identification component 270 through image recognition in which the frames of video imagery are subjected to a neural network or to a data store of imagery for comparison matching, in order to identify the context of the video imagery.

Of note, in the context identification component 270, an associated object may be determined in respect to the determined context, for instance as set forth in a table that maps contexts to objects. Once the context identification component 270 determines the context, a boundary detection unit 290 determines one or more objects of interest for the determined context. In this regard, by reference to a lookup table, the boundary detection unit 290 selects one or more objects of interest for the context and then processes each block of a first selected frame of the video imagery in order to identify whether or not the block pertains to one of the objects of interest selected for the context--hence, a region of greater interest in respect to the determined context, or a region of lesser interest. Optionally, each frame of the video may be checked to verify context or detect a change in context so that a different set of objects of interest may looked up from the table. As well, optionally, multiple different levels of interest may be defined in respect to the context depending upon a corresponding one of the objects selected for the context, which may range from a region of highest interest, to a region of lowest interest, and optionally, may include one or more intermediate regions of interest.

To that end, the neural network 280 is trained to compute for each provided pixel or block of pixels, a probability that the pixel or block of pixels are included as part of one of the objects of interest selected for the context. Consequently, the program instructions for each block invoke high-quality compression 250 for a pixel or block of pixels within the defined region of interest, whereas the program instructions invoke low quality compression 260 for a pixel or block of pixels outside of the defined region of interest. To the extent that other regions of intermediate interest are defined, the program instructions further are enabled to invoke upon a pixel or block of pixels in a frame, correspondingly intermediate levels of compression.

In each instance, the program instructions determine and save a map of quality values of corresponding blocks of pixels indicating the level of compression applied to the corresponding pixel or block of pixels. As will be understood, each of the compressors 250, 260 act upon the relevant pixel or block of pixels of each frame in place so that the compressed form of each frame is the byproduct of compression process. As it will be further understood, on decompression, a traditional decoder is able to be used, without modification, to decompress the video imagery.

Figure 3:
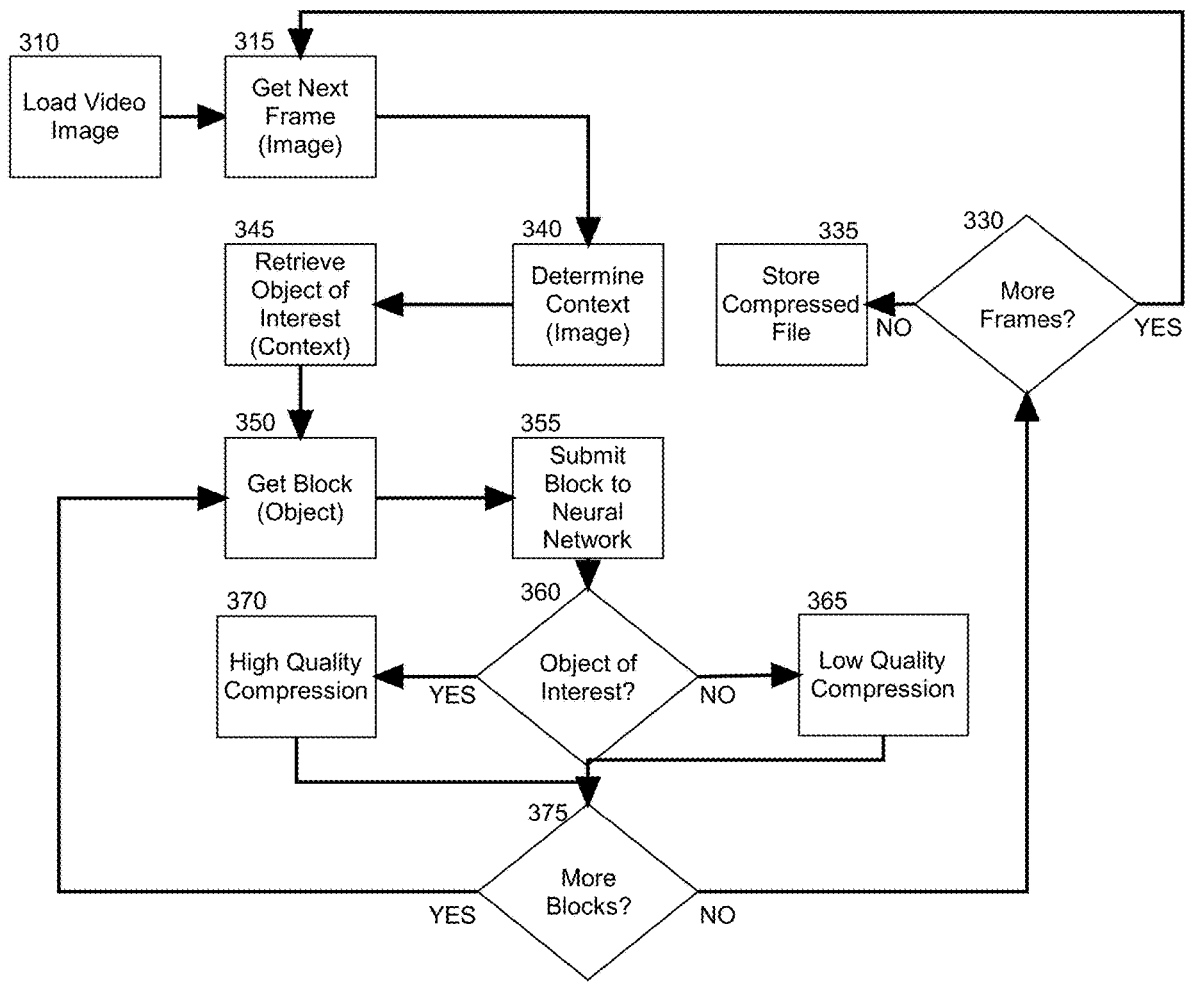

In even yet further illustration of the operation of the hybrid video compression/decompression module 300, FIG. 3 is a flow chart illustrating a process for semantically-segmented video compression. Beginning in block 310, video imagery is loaded from a location and in block 315, a first frame or sequence of frames of the video imagery is retrieved and in block 340 a context is determined for the video imagery. Then, in block 345, an object of interest is determined for the context. In block 350, the frame is received and in block 355, a pixel, a block of pixels or multiple blocks of pixels are submitted to the neural network in order to determine if the pixel, block of pixels or multiple blocks of pixels, as the case may be, reside within a region of higher interest for the determined context. In decision block 360, if it is determined by the neural network that the foregoing are not within the region of higher interest, in block 365 the pixel, block of pixels or multiple blocks of pixels are compressed with lower quality compression (e.g.

more lossy). In contrast, in decision block 360 if it is determined by the neural network that the pixel, block of pixels, or multiple blocks of pixels are within the region of higher interest, in block 370 the pixel, block of pixels or multiple blocks of pixels are compressed with higher quality compression (e.g. less lossy). Thereafter, in decision block 375 it is determined if an additional pixel, block of pixels or additional multiple blocks of pixels remain to be processed. If so, the next pixel, block of pixels or mutiple blocks of pixels are retrieved for processing in block 350. Otherwise, it is determined in decision block 330 if more frames remain to be processed in the video imagery. If so, a next frame is retrieved for the video imagery in block 315. Otherwise, in block 335 the compressed frames of the video imagery are stored as a compressed file.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A semantically-segmented video compression method comprising:
   loading into memory of a computer, a neural network trained to compute for each provided pixel or block of pixels, a probability that the pixel or block of pixels are included as part of an object of interest, and further loading into the memory, a frame of video imagery;
   determining a context for the frame and selecting an object of interest mapped to the context;

submitting the frame to the neural network in the memory of the computer so as to identify within the frame, a portion of the frame of the video imagery deemed to be of greater interest than other portions of the frame of video imagery based upon the object of interest of the context determined for the video imagery; and, performing a hybrid compression of the video imagery that includes both a higher quality compression of the portion of the video imagery determined to be of greater interest that produces a minimization of loss during decompression and also a lower quality compression of the other portions of the video imagery outside of the portion determined to be of greater interest that produces more loss during decompression.

2. The method of claim 1, wherein the compression is performed by submitting each block of pixels of the video imagery to a neural network trained to indicate whether or not the block of pixels is of greater interest in respect to the determined context.

3. The method of claim 1, wherein multiple different portions of the frame are deemed to be of different degrees of interest based upon the determined context and different corresponding objects in the frame are identified and classified at different levels of importance so that the hybrid compression includes different modes of compression at different levels of aggressiveness associated with the different levels of importance.

4. The method of claim 1, further comprising image processing the frame to identify the context of the frame.

5. The method of claim 1, wherein the context is a sporting event and the object is a player.

6. The method of claim 1, wherein the context is a lobby of a building.

7. A semantically-segmented video compression system comprising:
   a host computer with memory and at least one processor;
   a video compressor executing in the memory of the host computer; and,
   a semantically-segmented compression module comprising computer program instructions loaded in the memory of the host computer, the instructions enabled to perform:
     loading into the memory, a neural network trained to compute for each provided pixel or block of pixels, a probability that the pixel or block of pixels are included as part of an object of interest, and further loading into the memory, a frame of video imagery;
     determining a context mapped to the frame and selecting an object of interest for the context;
     submitting the frame to the neural network in the memory of the computer so as to identify within the frame, a portion of the frame of the video imagery deemed to be of greater interest than other portions of the frame of video imagery based upon the object of interest of the context determined for the video imagery, and an object pre-specified to be of importance to the context; and,
     performing a hybrid compression of the video imagery that includes both a higher quality compression of the portion of the video imagery determined to be of greater interest that produces a minimization of loss during decompression and also a lower quality compression of the other portions of the video imagery outside of the portion determined to be of greater interest that produces more loss during decompression.

8. The system of claim 7, wherein the hybrid compression is performed by submitting each block of the video imagery to a neural network trained to indicate whether or not the block is of greater interest in respect to the determined context.

9. The system of claim 7, wherein multiple different portions of the frame are deemed to be of different degrees of interest based upon the determined context and different corresponding objects in the frame are identified and classified at different levels of importance so that the hybrid compression includes different modes of compression at different levels of aggressiveness associated with the different levels of importance.

10. The system of claim 7, wherein the program instructions are further enabled to image process the frame to identify a context of the frame.

11. The system of claim 7, wherein the context is a sporting event and the object is a player.

12. A computer program product for semantically-segmented video compression, the computer program product including a non-transitory computer readable storage medium having program instructions embodied therewith, the program instructions executable by a device to cause the device to perform a method including:
   loading into memory of a computer, a neural network trained to compute for each provided pixel or block of pixels, a probability that the pixel or block of pixels are included as part of an object of interest, and further loading into the memory, a frame of video imagery;
   determining a context mapped to the frame and selecting an object of interest for the context;
   submitting the frame to the neural network in the memory of the computer so as to identify within the frame, a portion of the frame of the video imagery deemed to be of greater interest than other portions of the frame of video imagery based upon the object of interest of the context determined for the video imagery, and an object pre-specified to be of importance to the context; and,
   performing a hybrid compression of the video imagery that includes both a higher quality compression of the portion of the video imagery determined to be of greater interest that produces a minimization of loss during decompression and also a lower quality compression of the other portions of the video imagery outside of the portion determined to be of greater interest that produces more loss during decompression.

13. The computer program product of claim 12, wherein the hybrid compression is performed by submitting each block of the video imagery to a neural network trained to indicate whether or not the block is of greater interest in respect to the determined context.

14. The computer program product of claim 13, wherein multiple different portions of the frame are deemed to be of different degrees of interest based upon the determined context and different corresponding objects in the frame are identified and classified at different levels of importance so that the hybrid compression includes different modes of compression at different levels of aggressiveness associated with the different levels of importance.

15. The computer program product of claim 13, wherein the method further includes image processing the frame to identify a context of the frame.

16. The computer program product of claim 13, wherein the context is a sporting event and the object is a player.

17. The computer program product of claim 13, wherein the context is a lobby of a building.

18. The computer program product of claim 13, wherein the context is a human face on a video call.

* * * * *